United States Patent
DeDe et al.

(10) Patent No.: US 8,820,045 B2
(45) Date of Patent: *Sep. 2, 2014

(54) AUXILIARY POWER UNIT FIRE ENCLOSURE DRAIN SEAL

(75) Inventors: Brian C. DeDe, San Diego, CA (US); David Lau, San Diego, CA (US); David Ronald Adair, Valley Center, CA (US); Christine Ingrid Schade, San Diego, CA (US)

(73) Assignee: United Technologies Corporation, Hartford, CT (US)

( * ) Notice: Subject to any disclaimer, the term of this patent is extended or adjusted under 35 U.S.C. 154(b) by 1066 days.

This patent is subject to a terminal disclaimer.

(21) Appl. No.: 12/847,359

(22) Filed: Jul. 30, 2010

(65) Prior Publication Data

US 2012/0023897 A1 Feb. 2, 2012

(51) Int. Cl.
*F02G 3/00* (2006.01)

(52) U.S. Cl.
USPC .......................................... 60/39.094; 60/800

(58) Field of Classification Search
USPC ........... 60/39.094, 800; 110/165 R, 265, 336; 431/3
See application file for complete search history.

(56) References Cited

U.S. PATENT DOCUMENTS

| | | | | |
|---|---|---|---|---|
| 1,813,100 A * | 7/1931 | Swindle | ........................... | 138/45 |
| 2,814,931 A * | 12/1957 | Johnson | ..................... | 60/39.094 |
| 2,851,317 A * | 9/1958 | Greifenstein | ................. | 277/456 |
| 2,886,133 A * | 5/1959 | Mauck et al. | ................. | 60/39.08 |
| 2,949,736 A * | 8/1960 | Rubbra | ........................... | 60/800 |
| 3,371,482 A * | 3/1968 | Camboulives | .................. | 60/796 |
| 3,808,796 A * | 5/1974 | Spears, Jr. | ................... | 60/39.094 |
| 3,884,809 A * | 5/1975 | Logsdon | ........................ | 210/163 |
| 4,034,560 A * | 7/1977 | Chute | .......................... | 60/39.08 |
| 4,163,366 A * | 8/1979 | Kent | ............................ | 60/226.1 |
| 4,506,851 A * | 3/1985 | Gupta et al. | ................ | 244/129.1 |
| 4,896,499 A * | 1/1990 | Rice | ................................ | 60/792 |
| 5,261,240 A * | 11/1993 | Oyler et al. | ...................... | 60/734 |
| 5,292,138 A * | 3/1994 | Glynn et al. | ................... | 277/422 |
| 5,996,938 A * | 12/1999 | Simonetti | ................... | 244/129.1 |
| 6,244,034 B1 | 6/2001 | Taylor et al. | | |
| 6,308,915 B1 | 10/2001 | Liston et al. | | |
| 7,093,447 B2 | 8/2006 | Thompson et al. | | |
| 7,093,666 B2 | 8/2006 | Trumper | | |
| 7,155,896 B2 * | 1/2007 | Jansen et al. | ................ | 60/39.094 |
| 7,232,097 B2 | 6/2007 | Noiseux et al. | | |
| 7,337,605 B2 | 3/2008 | Hagshenas | | |
| 7,526,921 B2 * | 5/2009 | Williams et al. | ................. | 60/796 |
| 7,664,590 B2 * | 2/2010 | Runkle et al. | .................. | 701/100 |
| 2006/0032974 A1 | 2/2006 | Williams | | |
| 2008/0099611 A1 | 5/2008 | Martino Gonzalez et al. | | |
| 2009/0191047 A1 | 7/2009 | Schlinker et al. | | |
| 2012/0023889 A1* | 2/2012 | DeDe et al. | ................... | 60/39.11 |
| 2012/0023896 A1* | 2/2012 | DeDe et al. | ................. | 60/39.094 |
| 2012/0023897 A1* | 2/2012 | DeDe et al. | ................. | 60/39.094 |

* cited by examiner

*Primary Examiner* — Ehud Gartenberg
*Assistant Examiner* — Lorne Meade
(74) *Attorney, Agent, or Firm* — Kinney & Lange, P.A.

(57) ABSTRACT

A drain assembly for an auxiliary power unit having a hot zone formed by a combustor case comprises a fire enclosure, a drain fitting, a discharge port and a piston seal. The fire enclosure encapsulates the hot zone of the combustor case. The drain fitting connects to the fire enclosure. The discharge port extends from the combustor case into the drain fitting. The piston seal is positioned between the drain fitting and the discharge port.

13 Claims, 3 Drawing Sheets

AUXILIARY POWER UNIT FIRE ENCLOSURE DRAIN SEAL

STATEMENT OF GOVERNMENT INTEREST

The U.S. Government has a paid-up license in this invention and the right in limited circumstances to require the patent owner to license others on reasonable terms as provided for by the terms of Contract No. N00019-06-0081 and Sub-Contract No. 4500019224 awarded by the United States Navy.

BACKGROUND

The present invention is directed to auxiliary power units having fire enclosures. More particularly, the invention relates to seals for joining drains to fire enclosures in the auxiliary power unit.

Auxiliary power units (APUs) comprise gas turbine engines that operate to provide various power inputs to aircraft, such as helicopters, when the main propulsion engines are not operating, such as during ground operations or during the event of an outage during flight. APUs can additionally provide supplemental power to that generated during main engine operations. APUs typically comprise gas turbine engines having a compressor and a turbine, between which a combustor burns fuel. Through a gearbox, the turbine provides mechanical input to an electrical generator, while compressed air bled from the compressor is used to supply various environmental control systems.

APUs are typically located within the outer skin of the fuselage of the aircraft. Thus, it is desirable to encapsulate hot sections of the APU to provide a fire break where fuel is present. Conventional practice, such as is described in U.S. Pat. No. 7,526,921 to Williams et al., involves rigidly bolting a fire enclosure to various fixed positions on the APU. Temperature variations that arise during different operating cycles of the APU produce thermal expansions of various APU components that alter the distances between the fixed positions. Thermal growth of the APU thus induces strain into the fire enclosure. The ability of the fire enclosure to tolerate deflection or bending is limited because the fire enclosure is not a structural component designed to absorb loading.

Furthermore, it is desirable to be able to drain fuel from the combustor out of the fire enclosure in the event of unburned fuel being present in the combustor, such as from a failed start or some other such occurrence. Previous attempts at providing drains on APU fire enclosures involved using check valves that needed to be actively closed to prevent combustor air from escaping during operation of the APU and then opened to drain fuel. These valves, however, typically failed to a closed position, which could lead to fuel pooling within the combustor causing a fire hazard. Other fire enclosures, such as described in the aforementioned patent to Williams et al., involve bleed air ports having bulb seals that require precise alignment of parts. There is, therefore, a need for a fire enclosure drain that can accommodate thermal growths and misalignments within APU fire enclosures.

SUMMARY

The present invention is directed to a drain assembly for an auxiliary power unit having a hot zone formed by a combustor case. The drain assembly comprises a fire enclosure, a drain fitting, a discharge port and a piston seal. The fire enclosure encapsulates the hot zone of the combustor case. The drain fitting connects to the fire enclosure. The discharge port extends from the combustor case into the drain fitting. The piston seal is positioned between the drain fitting and the discharge port.

DETAILED DESCRIPTION

Figure 1:
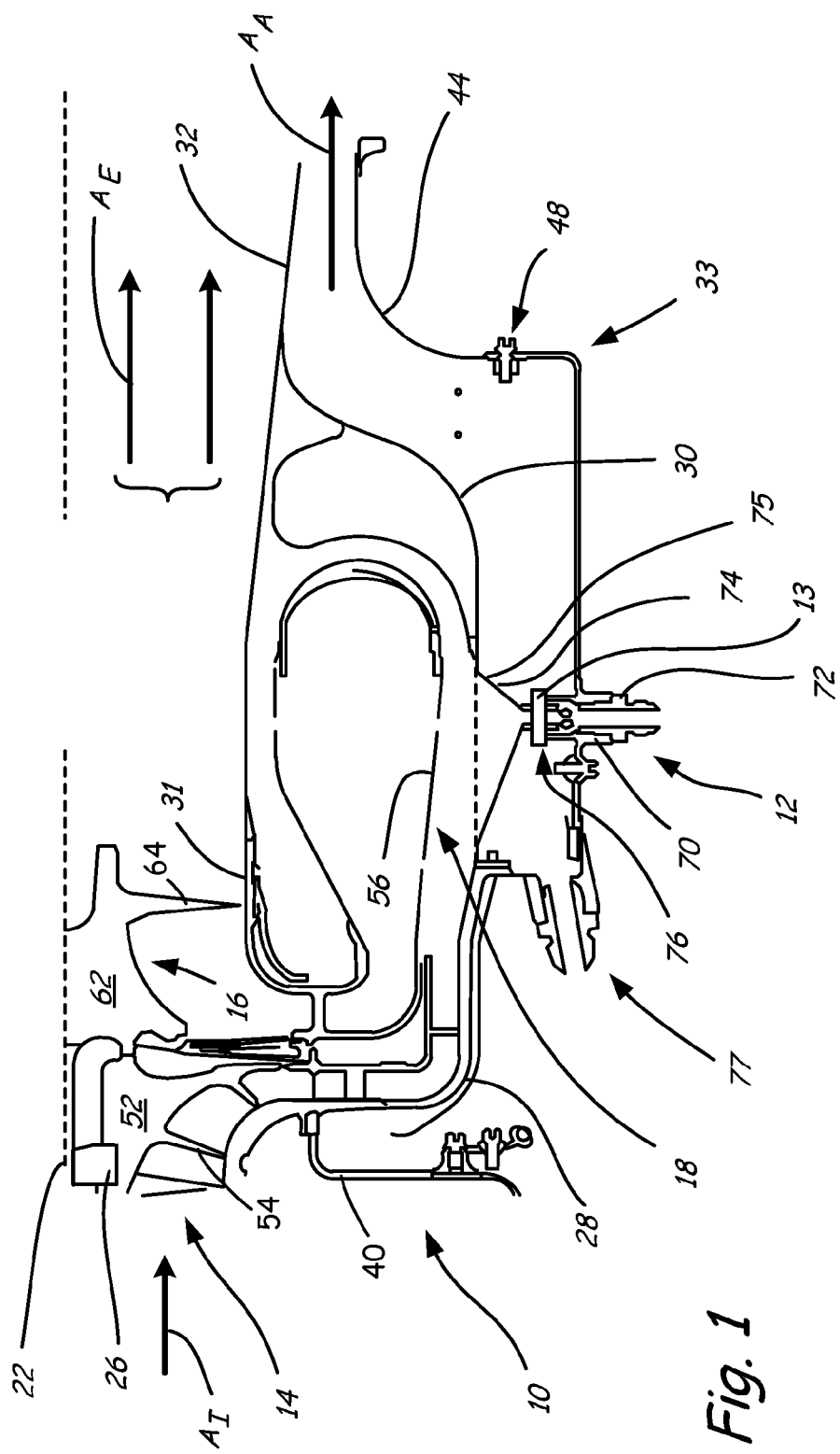
FIG. 1 is a partial cross-sectional view of a fire enclosure of an auziliary power unit having a drain assembly with an expansion joint.

FIG. 1 is a partial cross-sectional view of an example auxiliary power unit (APU) 10 having fire enclosure drain assembly 12 and piston seal assembly 13 of the present invention. APU 10 includes compressor section 14, turbine section 16 and combustor section 18. Compressor section 14, turbine section 16 and combustor section 18 comprise a gas turbine engine that may operate to provide mechanical input via shaft 22 to various components, such as an electrical generator (not depicted). Shaft 22 passes through compressor section 14, which is supported by bearings 26, and connects to turbine section 16. The gas turbine engine of compressor section 14, turbine section 16 and combustor section 18 is disposed within compressor case 28, combustor case 30, turbine case 31 and exhaust case 32. Compressor case 28, combustor case 30, turbine case 31 and exhaust case 32 form a serpentine flow path for air and gas that passes through the gas turbine engine. Fire enclosure 33 provides a containment shield for containing heat generated by combustor section 18 of the gas turbine engine and for containing flames generated by fuel vapors which come into contact with the outside of the combustor case 30. Drain assembly 12 permits fluid from inside combustor case 28 to drain outside of fire enclosure 33. Piston seal assembly 13 inhibits air from within combustor case 30 from leaking into fire enclosure 33.

Fire enclosure 33 and the other engine casing components are connected by a plurality of joints that provide structural integrity to APU 10, while also permitting some of the cases to translate to absorb stresses generated during operation of APU 10. Exhaust case 32 connects with turbine case 31. Combustor case 30 connects with exhaust case 32. Fire enclosure 33 connects with compressor case 28. Exhaust case 32 connects with fire enclosure 33 through aft support ring 44 and joint 48. Fire enclosure 33 provides a fire wall or fire break between the hot section of APU 10 and the surrounding environment. Drain assembly 12 and piston seal assembly 13 form an expansion joint that permits relative radial and axial displacement between fire enclosure 33 and combustor case 30.

Compressor case 28 comprises an annular body for housing compressor wheel 52 and compressor blades 54. Compressor case 28 has a converging inlet between outer and inner walls that comprise a passageway for conducting inlet air $A_I$ through compressor section 14. Combustor case 30 comprises a single walled annular body having a generally cylindrical side-wall portion and a radially converging end portion that houses combustor liner 56. The side-wall portion generally traverses the axial length of combustor liner 56, while the radially converging portion generally traverses the radial extent of combustor liner 56. Combustor case 30 directs airflow from compressor case 28 into combustor liner 56.

Turbine case 31 comprises an annular body for housing turbine wheel 62. Turbine case 31 has a diverging inlet between outer and inner walls that comprise a passageway for conducting compressed inlet air $A_I$ through turbine section 16. Turbine case 31 connects to the outlet of combustor liner 56 such that combustor liner 56 is encapsulated between compressor case 28, combustor case 30, exhaust case 32 and turbine case 31. Turbine case 31 directs airflow from combustor section 18 to exhaust case 32. Exhaust case 32 comprises a cylindrical body having a generally straight upstream section and a slightly diverging downstream section. Exhaust case 32 extends into combustor section 18 and traverses the axial length of combustor liner 56. Exhaust case 32 directs exhaust air $A_E$ from turbine section 16 out of APU 10.

Fire enclosure 33 is jointed to APU 10 radially outward of combustor case 30. Fire enclosure 33 comprises a generally annular or cylindrical body that includes various shapes to accommodate incorporation of other features, such as drain assembly 12. Drain assembly 12 includes fitting 70, connector 72 and scupper 74. Scupper 74 is joined to combustor case 30 and comprises trough 75 for collecting fluid from combustor section 18. Fitting 70 connects to fire enclosure 33 and provides a receptacle for the trough of scupper 74. Connector 72 provides a means for joining a hose or some other containment or flow conducting means to fitting 70. As is discussed in greater detail with respect to FIG. 3, fitting 70 and scupper 74 form joint 76, which comprises a radial and axial expansion joint that permits combustor case 30 to move relative to fire enclosure 33 during operation of APU 10, while also limiting the amount of compressed air leaked from combustor case 30. Piston seal assembly 13 is positioned between fitting 70 and scupper 74 to prevent compressed inlet air $A_I$ from within combustor section 18 from entering fire enclosure 33.

In various embodiments, compressor case 28 and turbine case 31 comprise bodies that have been manufactured, i.e. cast and machined. In various embodiments, combustor case 30 and exhaust case 32 comprise thin sheet-like bodies that have been shaped and formed. Compressor case 28, turbine case 31, combustor case 30 and exhaust case 32 are formed of various metal alloys, such as stainless steel, aluminum or titanium. Fire enclosure 33 comprises a thin sheet-like structure that is shaped and formed. In various embodiments, fire enclosure 33 is also made from various metal alloys as previously listed. However, in order to reduce the weight of APU 10, fire enclosure 33 is made from composite materials, such as a carbon fiber or fiber reinforced plastic composite, in other embodiments.

Inlet air $A_I$ is drawn into APU 10 by operation of compressor section 14. Inlet air $A_I$ continues through compressor section 14 to combustor case 30. Inside combustor case 30, compressed inlet air $A_I$ enters combustor liner 56, which is connected to the inlet of turbine case 31. Fuel is injected into liner 56 through fuel nozzles (not shown) and ignited by an igniter (not shown) to carry out a combustion process to generate high energy gases for turbine section 16. The high energy gases flow to turbine section 16 where they are expanded and useful work is extracted by turbine section 16.

Compressor section 14 and turbine section 16 are co-axially connected by shaft 22. As exhaust air $A_E$ passes through turbine section 16, turbine wheel 62 rotates shaft 22 through blades 64. Compressor wheel 52 is also coupled to turbine wheel 62 such that compressor blades 54 rotate to provide compressed air to combustor section 18 for carrying out the combustion process in combination with the fuel provided by the fuel nozzles. Shaft 22 extends from turbine wheel 62, through compressor wheel 52 and bearings 26. In other embodiments of the invention, drain assembly 12 and piston seal 13 can be used in other types of gas turbine engines having hot sections, such as industrial gas turbines, axial flow turbines and the like.

Operation of combustor section 18 produces heat. Temperatures within combustor section 18 can far exceed approximately 1,000 degrees Fahrenheit (~538° Celsius). Temperatures outside of combustor liner 56 reach well above approximately 400 degrees Fahrenheit (~204° Celsius) due to combustor section 18 and temperatures generated by compression of air in compressor section 14. Combustor section 18, therefore, comprises a hot zone within APU 10 where temperatures are above the flashpoint of fuel used in combustor section 18. In order to reduce the potential for hazard, the hot zone is encapsulated within fire enclosure 33 and other ducts of APU 10. Fitting 70, connector 72 and scupper 74 of drain assembly 12 prevent flames from escaping fire enclosure 33, while piston seal assembly 13 prevents compressed inlet air $A_I$ that escapes combustor case 30 from entering fire enclosure 33. Drain assembly 12 and piston seal assembly 13 permit expansion and contraction of fire enclosure 33 and combustor case 30.

Fire enclosure 33, compressor case 28, combustor case 30 and exhaust case 32 are joined. Compressor case 28, combustor case 30 and exhaust case 32 form a flow path for inlet air $A_I$ and exhaust air $A_E$. A flow path is provided into which ambient air $A_A$ flows. Fire enclosure 33 also includes drain assembly 12, which includes drain fitting 70, drain connector 72 and drain scupper 74, and piston seal assembly 13.

The combustion of air and fuel within combustor liner 56 and compression of air within compressor section 14 builds up heat and produces flames within APU 10. The flames are contained by combustor case 30 and exhaust case 32 while the heat can conduct through combustor case 30 and exhaust case 32. Due to the close proximity to liner 56 and heat generated by compressed air flow, combustor case 30 does not keep the temperatures outside of APU 10 below the flashpoint of fuel used in combustor section 18. Fire enclosure 33 provides a layer of containment to flames generated by fuel vapors which contact the exterior surface of combustor case 30 or exhaust case 32 and heat to ensure safe operation of APU 10 under all conditions. In particular, fire enclosure 33 provides a flame-proof heat zone within APU 10 to prevent the spread of heat and flames. Fire enclosure 33 is supported within APU 10 by connection to compressor case 28, combustor case 30 and exhaust case 32, which, along with forward support ring 40 and aft support ring 44, provide structural stability to fire enclosure 33.

Ambient air $A_A$ is allowed into fire enclosure 33. Exhaust air $A_E$ draws ambient air $A_A$ through fire enclosure 33. Within APU 10, ambient air $A_A$ cools combustor case 30. Ambient air $A_A$ also cools the exhaust plume produced by exhaust air $A_E$ outside of APU 10. Drain fitting 72 and drain scupper 74 of drain assembly 12 allow fuel from combustor 30 to drain out of APU 10 without entering fire enclosure 33. This eliminates mixing of fuel with water that collects in fire enclosure 33, which is drained separately form APU 10 via drain 77.

Joint 76 provides degrees of freedom for movement of fire enclosure 33. Joint 76 comprises a radial and axial expansion joint to provide freedom of movement to fire enclosure 33 in the radial and axial directions. The ability of joints, such as joint 76, including piston seal 13, to absorb displacement of combustor case 30 and exhaust case 32 reduces the strain induced in fire enclosure 33 and preserves the stability of fire enclosure 33. This helps permit fire enclosure 33 to be made from lighter and more brittle material.

Figure 2:
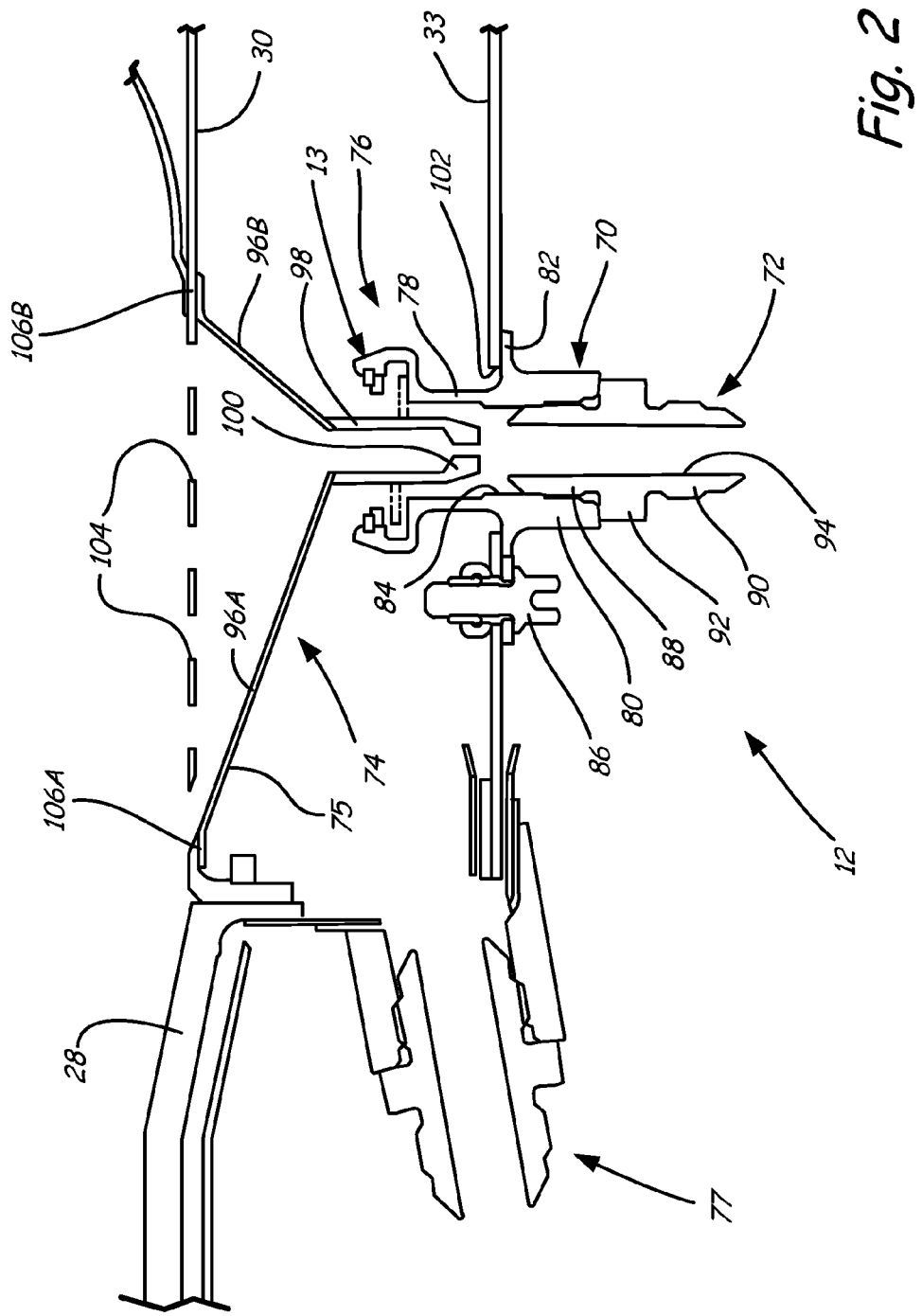
FIG. 2 shows the expansion joint of FIG. 1 connecting the fire enclosure to the combustor case through a piston seal included in the drain assembly.

FIG. 2 shows expansion joint 76 and piston seal assembly 13 connecting fire enclosure 33 to combustor case 30 within drain assembly 12. Drain assembly 12 includes fitting 70, connector 72 and scupper 74. Fitting 70 comprises first collar 78, second collar 80, base 82, passageway 84 and fastener 86. Connector 72 comprises first stem 88, second stem 90, flange 92 and through-bore 94. Scupper 74 includes first leg 96A, second leg 96B, cylindrical extension 98 and orifice 100. In one embodiment, fitting 70, connector 72 and scupper 74 are composed of a metal material, such as a stainless steel, aluminum or titanium alloy.

As illustrated in FIG. 2, drain assembly 12 is positioned between combustor case 30 and fire enclosure 33 at a position where combustor case 30 and fire enclosure 33 comprise generally parallel running annuluses; however, it will be understood that other configurations are contemplated within the scope of the invention. Fire enclosure 33 includes opening 102 into which drain fitting 70 is positioned. Base 82 is positioned around the exterior of opening 102 such that first collar 78 extends into fire enclosure 33. Fastener 86 is inserted through opposing bores in base 82 and fire enclosure 33 and secured with a bushing or nut to rigidly join fitting 70 to enclosure 33. Fastener 86 comprises one of several fasteners and in one embodiment three fasteners are used. Second collar extends from base 82 away from fire enclosure 33. Passageway 84 extends through first collar 78, second collar 80 and base 82 to link the interior and exterior of fire enclosure 33.

Drain scupper 74 is joined to a radially outward surface portion of combustor case 30 that includes perforations 104. First leg 96A and second leg 96B are joined to combustor case 30 via welding or some other such suitable fastening means at positions 106A and 106B, respectively. First leg 96A and second leg 96B slope away from combustor case 30 to join with cylindrical extension 98 at a trough, or low point, of scupper 74. First leg 96A is longer than second leg 96B such that angle of each leg with respect to combustor case 30 is different. The length of legs 96A and 96B are determined to position the trough at a low point within APU 10 based on the orientation of APU 10 when mounted in the aircraft in which it is used. Thus, in other embodiments, second leg 96B can be longer than first leg 96A. First leg 96A and second leg 96B terminate at a position radially outward of opening 102 in fire enclosure 33 and fitting 70. Cylindrical extension 98 extends from the trough through piston seal assembly 13 and into first collar 78 of fitting 70. Orifice 100 is positioned at the distal end of cylindrical extension 98 and aligns generally co-axially with passageway 84 of fitting 70 to feed connector 72.

Drain connector 72 is joined with fitting 70 to provide a means for removing fluid from combustor section 18. In the embodiment shown, connector 72 is configured to link with a hose to collect fluid from drain assembly 12. First stem 88 is inserted into second collar 80 of fitting 70. The outer diameter of first stem 88 is configured to form a force fit or interference fit with the inner diameter of second collar 80. First stem 88 includes ribs or other friction-increasing features for improving gripping with second collar 80. First stem 88 is inserted into second collar 80 until flange 92 engages collar 80. Second stem 90 extends from flange 92 to form a nipple, or fitting, around which a hose can be positioned. Second stem 90 includes friction-increasing means to enhance connection with the hose. The ends of first stem 88 and second stem 90 include tapered tips to facilitate insertion into collar 80 or a hose, respectively.

In the event un-burned fuel is present within combustor section 18, drain assembly 12 permits the fuel, or any other liquid, to pass through combustor case 30, fire enclosure 33 and out of APU 10. Fuel passes through perforations 104 and is funneled by first leg 96A and second leg 96B to cylindrical extension 98. Cylindrical extension 98 extends into first collar 78 to position orifice 100 near opening 102 in fire enclosure 33. As such, fuel drains into second collar 80. First collar 78 extends across a majority of the length of cylindrical extension 98 to extend the length over which joint 76 is able to radially expand. The outer diameter of cylindrical extension 98 is smaller than the inner diameter of first collar 78 such axial displacement can be accommodated. Thus, if combustor case 30 grows or contracts during operation of APU 10, cylindrical extension 98 remains within collar 78 such that orifice 100 remains generally aligned with through-bore 94. After passing through orifice 100, fuel enters collar 80 and through-bore 94 of connector 72, whereby the fuel is permitted to drain out of APU 10. The fuel is then collected and disposed of as appropriate.

Expansion joint 76 maintains the fire-proof integrity of fire enclosure 33. Base 82 is flush-mounted to fire enclosure 33 to provide metal-to-metal contact that prevents flames from traveling through opening 102. Also, the magnitudes of the inner diameter of cylindrical extension 98, the inner diameter of through-bore 94 or the distance between the outer diameter of cylindrical extension 98 and the inner diameter of first collar 78 can be sized to provide a flame-quenching or flame-arresting path that smothers or otherwise deprives flames emitting from fire enclosure 33 of oxygen such that they are extinguished before exiting fire enclosure 33.

Furthermore, joint 76 preserves the efficiency of the gas turbine of APU 10. Combustor section 18 is pressurized by compressor section 14 during operation of APU 10. Turbine section 16 operates more efficiently as the pressure is maintained throughout the combustion process. Thus, any leakage of compressed inlet air $A_I$ from combustor case 30 decreases the efficiency of APU 10. Orifice 100 comprises a small-diameter hole that is sized to permit liquid to pass through scupper 74, but to limit or meter the amount of combustor air that escapes from combustor case 30. Cylindrical extension 98 and orifice 100 comprise a port for discharging fluid from fire enclosure 33. However, in other embodiments, an unmetered discharge port may be used. Due to the pressurization of combustor section 18, any amount of air leaked out of orifice 100 tends to travel back into fire enclosure 33. The presence of heated combustor air within fire enclosure 33 is undesirable as it is advantageous to maintain temperatures within enclosure 33 below the flashpoint of fuel. Piston seal assembly 13 prevents combustor air from entering fire enclosure 33.

Figure 3:
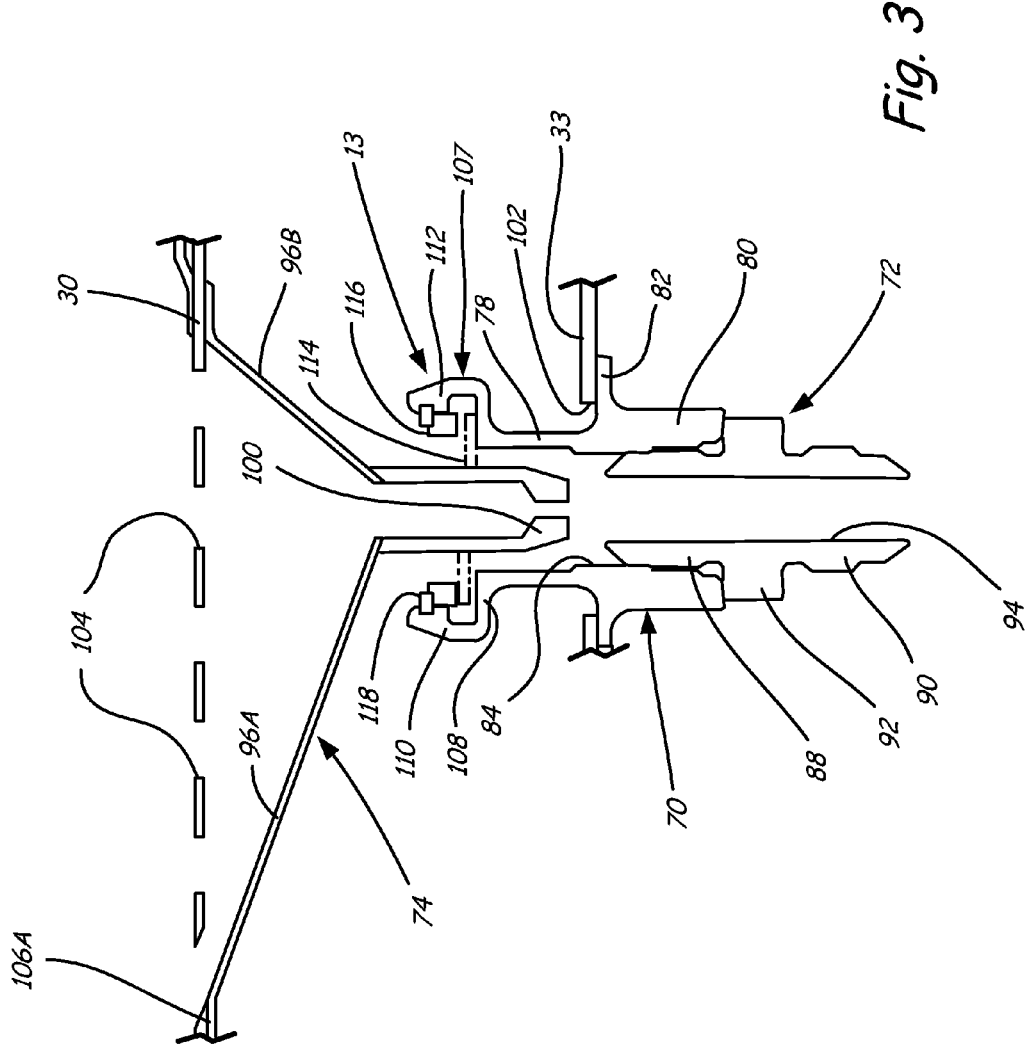
FIG. 3 shows the drain assembly of FIG. 2 having the piston seal disposed in a seal cup.

FIG. 3 shows drain assembly 12 of FIG. 2 having piston seal assembly 13 disposed in seal cup 107 formed by platform 108, sidewall 110 and overhang 112. Piston seal assembly 13 includes a piston ring formed by split washer 114 and split ring 116. First collar 78 of drain fitting 70 extends through opening 102 such that base 82 engages fire enclosure 33. Opening 102 is sufficiently large to accommodate the cup of piston seal assembly 13. Platform 108 comprises a disk-shaped body that increases the diameter of the top of first collar 78. Platform 108 forms a generally flat surface upon which the piston ring of piston seal assembly 13 rests. The diameter of platform 108 is larger than the diameter of split washer 114 and split ring 116. Sidewall 110 extends from the outer diameter of platform 108 to increase the length of first collar 78. The height of sidewall 110 is larger than the height of split washer 114 and split ring 116. Overhang 112 extends from sidewall 110 towards the center of first collar 78. The inner diameter of overhang 112 is larger than the diameter of split washer 114 and split ring 116 such that the piston ring is able to fit onto platform 108.

Split washer 114 comprises a disk-shaped body having a rectangular cross-section with a major axis extending perpendicular to first collar 78. The disk-shaped body is cut or split such that washer 114 is not a continuous annulus. The ends of split washer 114 are displaced from each other in the radial direction such that split washer 114 is resilient in the radial direction relative to the axis of APU 10. Split ring 116 comprises a disk-shaped body having a rectangular cross-section with a major axis extending parallel to first collar 78. The disk-shaped body is cut or split such that disk 116 is not a continuous annulus. The ends of split washer 114 are spaced from each other in the axial direction such that split ring 116 is resilient in the axial direction relative to the axis of APU 10. Split washer 114 and split ring 116 are welded to each other to form the piston ring.

The piston ring is positioned within the cup such that split washer 114 rests on platform 108 and split ring 116 faces away from platform 108. Split washer 114 is positioned below overhang 112, while split ring 116 extends alongside overhang 112. Retaining ring 118 is positioned within a notch on the inner diameter surface of overhang 112 to prevent the piston ring from being displaced from the cup of piston seal assembly 13. Split washer 114 is positioned around cylindrical extension 98 of scupper 74. The inner diameter of split washer 114 is sized to tightly fit around cylindrical extension 98 such that air is prevented from passing between. However, split washer 114 is sized to allow the piston ring to slide along cylindrical extension 98 to permit radial displacement between fire enclosure 33 and combustor case 30. Split ring 116 sits atop split washer 114 such that the resiliency of split washer 114 keeps the piston ring in compression between platform 108 and retaining ring 118. Split ring 116 deflects within sidewall 110 to permit axial displacement between fire enclosure 33 and combustor case 30. Piston seal assembly 13 thereby also increases radial and axial tolerances in the assembly of scupper 74 and fitting 70.

During operation of APU 10, combustor air exits fire enclosure 33 through scupper 74. Piston seal assembly 13 prevents the combustor air from leaking back through first collar 78 into fire enclosure 33. The combustor air continues through passageway 84 and through-bore 94 whereby it is expelled from APU 10. Thus, expansion joint 76 provided by drain assembly 12 and piston seal assembly 13 prevent flames from escaping fire enclosure 33, and prevent compressed inlet air $A_I$ that escapes combustor case 30 from entering fire enclosure 33. Drain assembly 12 and piston seal assembly 13 permit radial and axial expansion and contraction of fire enclosure 33 and combustor case 30.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An auxiliary power unit comprising:
    a gas turbine engine comprising:
        a combustor section including
        a combustor case
    a fire enclosure joined to the auxiliary power unit to circumscribe the combustor case; and
    a drain assembly configured to permit fluid within the combustor case to drain out of the fire enclosure, the drain assembly including:
        a piston seal configured to prevent combustor air from leaking into the fire enclosure;
        a scupper extending outward from the combustor case to form a trough;
        a drain fitting extending through an opening in the fire enclosure to align with the trough; and
        an orifice extended from the trough by a cylindrical body penetrating into the drain fitting to form an expansion joint;
    wherein the piston seal comprises a piston ring positioned around the cylindrical body within the drain fitting;
    wherein the combustor case includes perforations within a perimeter of the scupper;
    wherein the drain fitting includes a cup in which the piston ring is positioned; and
    wherein the cup comprises:
        a first collar extending away from the fire enclosure to receive the cylindrical body;
        a platform extending from the first collar and upon which the piston ring rests;
        a sidewall extending from the platform alongside the piston ring; and
        a retaining ring engaged with the sidewall to prevent the piston ring from being displaced from the cup.

2. The auxiliary power unit of claim 1 wherein the piston ring comprises:
    a split-ring; and
    a split-washer.

3. The auxiliary power unit of claim 1 wherein the drain fitting comprises:
    a fitting body positioned within the opening in the fire enclosure, the fitting body comprising:
        a base positioned outside of the fire enclosure;
        the first collar extending inward from the base through the opening in the fire enclosure to circumscribe the orifice; and
        a second collar extending outward from the base.

4. The auxiliary power unit of claim 3 wherein the drain fitting further comprises:
    a connector body comprising:
        a first stem extending into the second collar;
        a flange circumscribing the first stem;
        a second stem extending from the flange; and
        a through-bore extending through the first stem, the second stem and the flange.

5. The auxiliary power unit of claim 1 wherein the scupper includes:
    a first leg extending from the combustor case to the cylindrical body; and
    a second leg extending from the combustor case to the cylindrical body;
    wherein the first leg is longer than the second leg; and
    wherein the first leg and the second leg form the trough and connect the cylindrical body to the combustor case.

6. The auxiliary power unit of claim 1 wherein the fire enclosure is comprised of a composite material.

7. The auxiliary power unit of claim 1 wherein the perforations, the scupper, the cylindrical body, the orifice and the drain fitting form a radial fluid path between the combustor case and the fire enclosure.

8. The auxiliary power unit of claim 1 wherein the orifice comprises a restriction of an interior diameter of the cylindrical body.

9. A drain system for a combustor section of a gas turbine engine, the drain system comprising:
a fire enclosure body including an opening;
a drain fitting connected to the fire enclosure body, the drain fitting comprising:
a first collar extending through the opening into the fire enclosure body, the
first collar includes a cup in which a piston ring is positioned;
a first stem extending from the first collar outside of the fire enclosure body; and
a passageway extending through the first collar and the first stem;
a scupper disposed within the fire enclosure body, the scupper comprising:
a trough;
a cylindrical body extending from the trough; and
an orifice positioned on the cylindrical body and penetrating into the first collar to form an expansion joint; and
a piston ring positioned around the cylindrical body within the first collar;
wherein the cup comprises:
a platform extending away from the first collar and upon which the piston ring rests;
a sidewall extending from the platform alongside the piston ring; and
a retaining ring engaged with the sidewall to prevent the piston ring from being displaced from the cup.

10. The drain system of claim 9 wherein the drain fitting comprises:
a fitting body comprising:
the first collar;
a base positioned outside of the fire enclosure body and from which the first collar extends; and
a second collar extending outward from the base; and
a connector body comprising:
a second stem extending into the second collar;
a flange circumscribing the first stem;
the first stem extending from the flange; and
a through-bore extending through the first stem, the second stem and the flange.

11. The drain system of claim 10 wherein the scupper comprises:
a first leg extending from the combustor case to the cylindrical body; and
a second leg extending from the combustor case to the cylindrical body;
wherein the first leg is longer than the second leg; and
wherein the first leg and the second leg form the trough and connect the cylindrical body to the combustor case.

12. The drain system of claim 9 wherein the piston ring comprises:
a split-ring; and
a split-washer.

13. A drain assembly for an auxiliary power unit including a hot zone formed by a combustor case of a gas turbine, the drain assembly comprising:
a fire enclosure encapsulating the hot zone of the combustor case;
a drain fitting connected to the fire enclosure;
a discharge port extended from the combustor case into the drain fitting, the discharge port including an orifice to meter flow between the fire enclosure and combustor case; and
a piston seal positioned between the drain fitting and the discharge port;
wherein the drain fitting comprises:
a fitting body comprising:
a base positioned outside of the fire enclosure;
a first collar extending inward from the base through an opening in the fire enclosure to circumscribe the discharge port; and
a second collar extending outward from the base; and
a connector body comprising:
a first stem extending into the second collar;
a flange circumscribing the first stem;
a second stem extending from the flange; and
a through-bore extending through the first stem, the second stem and the flange;
wherein the discharge port extends from the combustor case by a scupper comprising:
a first leg extending from the combustor case to a cylindrical body; and
a second leg extending from the combustor case to the cylindrical body;
wherein the first leg is longer than the second leg, and the first leg and the second leg form a trough connecting the cylindrical body to the combustor case; and
wherein the piston seal comprises a split-ring circumscribing the discharge port within the first collar.

* * * * *